No. 734,579. PATENTED JULY 28, 1903.
J. E. LENHOLT.
NUT LOCK.
APPLICATION FILED AUG. 26, 1902.
NO MODEL.

John E. Lenholt, Inventor,

Witnesses
Howard D. Orr.
B. G. Foster

By E. G. Siggers
Attorney

No. 734,579. Patented July 28, 1903.

UNITED STATES PATENT OFFICE.

JOHN EMANUEL LENHOLT, OF CROMWELL, CONNECTICUT, ASSIGNOR OF ONE-HALF TO A. N. PIERSON, OF CROMWELL, CONNECTICUT.

NUT-LOCK.

SPECIFICATION forming part of Letters Patent No. 734,579, dated July 28, 1903.

Application filed August 26, 1902. Serial No. 121,114. (No model.)

*To all whom it may concern:*

Be it known that I, JOHN EMANUEL LENHOLT, a citizen of the United States, residing at Cromwell, in the county of Middlesex and State of Connecticut, have invented a new and useful Nut-Lock, of which the following is a specification.

This invention relates to nut-locks; and the object thereof is to provide simple means which will effectively fasten a nut to a bolt and also to the surface against which the nut is clamped.

The invention is fully illustrated in the accompanying drawings, wherein—

Figure 1:
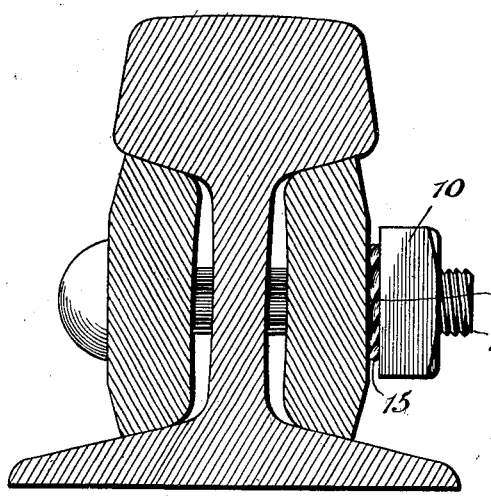
Figure 2:
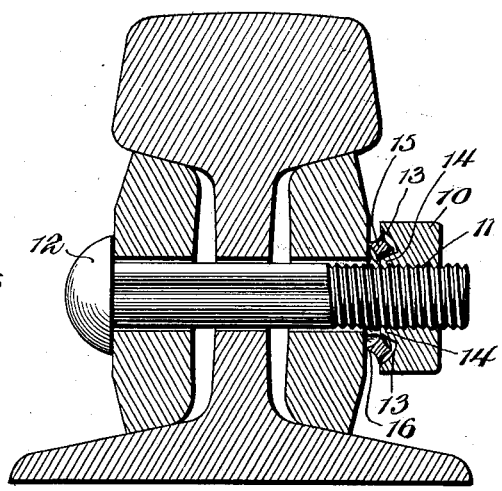
Figure 3:
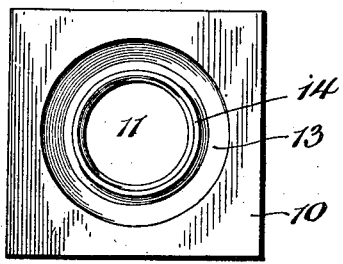
Figure 4:

Figure 1 is a sectional view through a railroad-rail and fish-plates, showing the usual bolt and the nut thereon locked by the improved means. Fig. 2 is also a sectional view, the nut being shown in section. Fig. 3 is a plan view of the inner face of the nut. Fig. 4 is a perspective view of the locking-washer.

Similar reference-numerals indicate corresponding parts in all the figures of the drawings.

The nut is designated by the reference-numeral 10 and may be of any desired shape, having the usual screw-threaded opening 11 therethrough designed to receive the threaded end of an ordinary bolt, (shown at 12.) This nut is provided in its inner face with an annular seat or groove 13, that is spaced from and concentric with the opening 11, forming therebetween a compressible wall or flange 14, that preferably tapers toward its outer end. A circular locking-washer 15 is arranged to be seated in the groove 13 and comprises a split ring the ends of which are arranged out of alinement, said ring being formed of an angular bar that is twisted to provide a plurality of spiral cutting edges 16. The diameter of this ring is such that when it is placed in the seat or groove 13 its inner and outer edges will engage the opposite walls of the groove, and thus when the nut is threaded home upon the bolt the washer being forced into the groove will in turn compress the wall 14 tightly against the threads of said bolt, and in this manner the nut will be locked against retrograde movement. At the same time the spiral edges 16 of the washer will bite into the walls of the groove and the surface against which the washer rests, thus making the lock more secure.

It will be apparent that a lock constructed in accordance with the illustration and description will securely hold a nut upon a bolt, so that it will not become accidentally displaced by shocks and jars. It is therefore especially useful on railways, though it will be evident that it can be employed for various other purposes.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

The combination with a nut having an opening, the walls of which are threaded, and an annular seat formed in its inner face, said seat being concentric with and spaced from the opening and forming therebetween a compressible flange, of a locking-washer fitted in the seat and comprising a split ring the ends of which are located out of alinement, said ring being formed of a twisted angular bar that is thicker than the distance between the walls of the seat and therefore is arranged to force the compressible flange into engagement with the bolt passing through the opening in the nut, the edges of the washer, furthermore, biting into the walls of the seat and the surface against which the washer rests, thereby serving as additional holding means for the nut.

In testimony that I claim the foregoing as my own I have hereto affixed my signature in the presence of two witnesses.

JOHN EMANUEL LENHOLT.

Witnesses:
  A. F. OBERG,
  ALF SANDSTRAN.